US009420081B2

(12) United States Patent
Shen et al.

(10) Patent No.: US 9,420,081 B2
(45) Date of Patent: *Aug. 16, 2016

(54) DIALED DIGITS BASED VOCODER ASSIGNMENT

(71) Applicant: AT&T Mobility II LLC, Atlanta, GA (US)

(72) Inventors: Jun Shen, Redmond, WA (US); Jack Denenberg, Sammamish, WA (US); Alan MacDonald, Bellevue, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 192 days.

This patent is subject to a terminal disclaimer.

(21) Appl. No.: 14/217,552

(22) Filed: Mar. 18, 2014

(65) Prior Publication Data

US 2014/0200049 A1 Jul. 17, 2014

Related U.S. Application Data

(63) Continuation of application No. 12/626,059, filed on Nov. 25, 2009, now Pat. No. 8,676,575, which is a continuation of application No. 11/423,742, filed on Jun. 13, 2006, now Pat. No. 7,630,885.

(51) Int. Cl.
*H04M 1/60* (2006.01)
*G10L 19/24* (2013.01)

(52) U.S. Cl.
CPC ............. *H04M 1/6041* (2013.01); *G10L 19/24* (2013.01)

(58) Field of Classification Search
CPC .............................. H04M 1/6041; G10L 19/24
USPC ......................................................... 704/221
See application file for complete search history.

(56) References Cited

U.S. PATENT DOCUMENTS

| 6,363,339 | B1 | 3/2002 | Rabipour et al. |
| 6,597,780 | B1 | 7/2003 | Knoerle et al. |
| 7,027,570 | B2 | 4/2006 | Pines et al. |
| 7,508,810 | B2 | 3/2009 | Moinzadeh et al. |
| 7,630,885 | B1 | 12/2009 | Shen et al. |
| 7,991,356 | B2 | 8/2011 | Batey et al. |
| 8,014,723 | B2 | 9/2011 | Batey et al. |
| 8,243,731 | B2 | 8/2012 | Rajan |
| 8,676,575 | B2 * | 3/2014 | Shen .................. H04M 1/6041 704/221 |

OTHER PUBLICATIONS

Office Action mailed May 13, 2009 in U.S. Appl. No. 11/423,742.
Notice of Allowance mailed Oct. 13, 2009 in U.S. Appl. No. 11/423,742.
Office Action mailed Jun. 24, 2013 in U.S. Appl. No. 12/626,059.
Notice of Allowance mailed Oct. 31, 2013 in U.S. Appl. No. 12/626,059.

* cited by examiner

*Primary Examiner* — Susan McFadden
(74) *Attorney, Agent, or Firm* — Hartman & Citrin LLP

(57) ABSTRACT

A system and method for providing voice communications with desired characteristics based upon the intended recipient of a voice communication. An apparatus includes a list of dial strings associated with parties having desired voice communication characteristics. A dial string entered by a user and associated with an intended recipient is compared to a list of preferred dial strings to determine the characteristics of an encoded voice signal to be sent to the recipient. The apparatus can include a vocoder having different bit rate modes and a bit rate mode is selected based upon the dial string entered by a user. Dial strings can be stored at the device or on a network. The apparatus can include a mode selector to select a desired vocoder mode to generate an encoded voice signal.

20 Claims, 8 Drawing Sheets

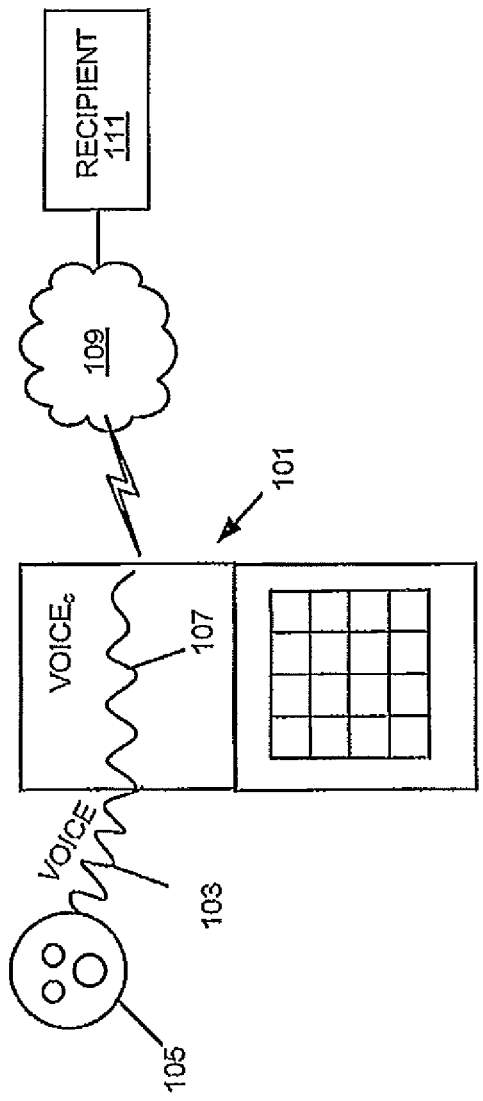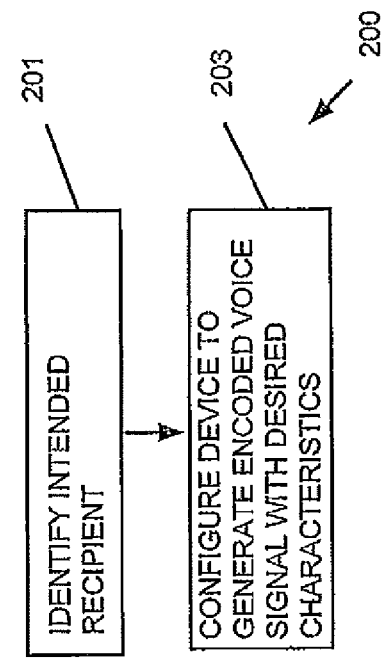

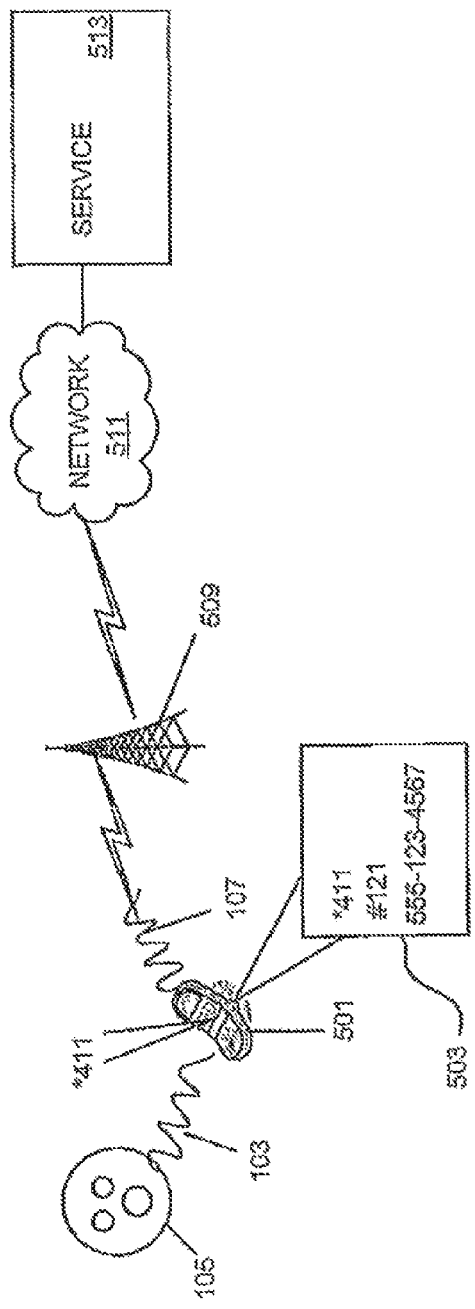
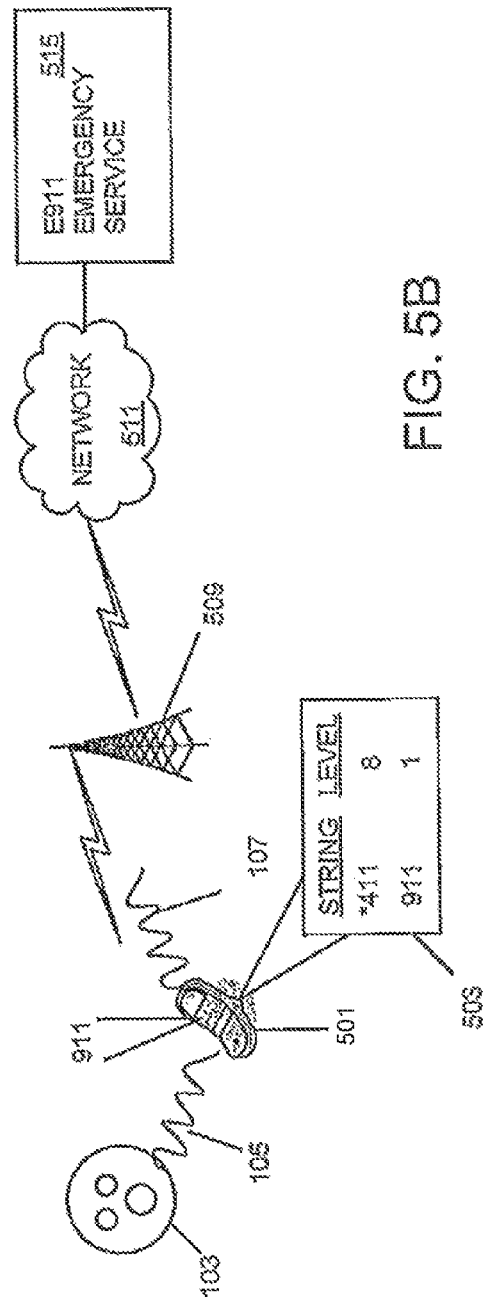
FIG. 5A
FIG. 5B

DIALED DIGITS BASED VOCODER ASSIGNMENT

CROSS-REFERENCE TO RELATED APPLICATIONS

This patent application is a continuation of and claims priority to U.S. Pat. application No. 12/626,059 filed Nov. 25, 2009, now U.S. Pat. No. 8,676,575, which is a continuation of U.S. Pat. application No. 11/423,742, filed Jun. 13, 2006, now U.S. Pat. No. 7,630,885.

FIELD OF THE INVENTION

The present invention relates to methods and systems for controlling the operation of a voice communications device such as a cellular telephone.

BACKGROUND

Voice communication devices often employ a vocoder to synthesize and/or compress speech into an encoded voice signal. For example, the speech of a user talking on a cellular telephone can be received, digitized and compressed by a vocoder to generate an encoded voice signal. A voice communications session can be established between the user and an intended recipient of a voice communication and the encoded voice signal sent to the recipient so that it is received, decoded, and provided to the recipient as speech.

Vocoders can employ a variety of encoding techniques and the characteristics of an encoded voice signal depend upon the particular techniques used, such as the algorithms and bit rates employed. Generally, the lower the bit rate used by a vocoder, the fewer number of bits in the resulting encoded signal, and the less bandwidth required for transmitting the encoded signal over a communications network. Thus, the use of lower bit rate vocoders on a communications network can increase network utilization. But while an encoded voice signal produced by a lower bit rate vocoder uses less bandwidth than that produced by of a higher bit rate vocoder, the resulting signal is typically of reduced quality. A lower quality encoded voice signal results in lower quality speech reproduction for the recipient of the voice communication making the voice communication more difficult to understand. Voice communications providers thus face a tradeoff between network efficiency and voice signal quality when selecting a vocoder for use on their networks.

Although the signal quality of first generation low bit rate vocoders was relatively poor, newly developed low bit rate vocoders provide sufficient signal quality to be acceptable for many voice communications, such as person-to-person calls, and low bit rate vocoders have been deployed on some GSM cellular telecommunications networks. But voice quality remains an issue even for these newer low bit rate vocoders, especially in poor signal environments.

One recent attempt to address the tradeoff between signal quality and network efficiency is the development of Adaptable Multiple Rate (AMR) vocoders which have the ability to process voice signals at different bit rates. For example, an AMR vocoder can include a plurality of voice codecs, each rated at a different bit rate. During operation of the AMR vocoder a particular codec having a desired bit rate is used based upon some criteria, such as radio signal strength or interference levels. For example, when signal strength is low a high bit rate codec can be used to produce a high quality encoded voice signal and when signal strength is high a low bit rate codec can be used to produce a low bandwidth encoded voice signal. AMR vocoders thus provide for increased system efficiency by using low bit rate codecs to produce low bandwidth signals for the majority of communications and provide increased voice quality by employing high bit rate codecs when network conditions warrant.

The default behavior of AMR vocoders, however, might not be suitable for certain types of communications. Thus, it would be desirable to provide systems and methods for controlling the characteristics of a voice communication and the associated encoded voice signal generated by a voice communications device based on the intended recipient of the voice communication.

SUMMARY

The present invention provides apparatus, methods and systems for generating an encoded voice signal having characteristics adapted for the intended recipient of a voice communication. In exemplary embodiments, the systems and methods herein are directed to controlling—based on the intended recipient of a voice communication—one or more characteristics of a voice communications device that generates and transmits an encoded voice signal.

An exemplary method of the invention comprises: determining an intended recipient of a voice communication and configuring a vocoder to produce an encoded voice signal in response to the identified intended recipient.

In exemplary embodiments the step of determining an intended recipient includes analyzing a dial string entered by a user. For example, a list of preferred dial strings associated with parties for which voice communications with particular characteristics can be provided. When a user enters a dial string to initiate a communications session with an intended recipient a comparison can be made between the user-entered dial string and the list of preferred dial strings. If the user-entered dial string matches a preferred dial string then an encoded voice signal is generated according to the desired characteristics for that preferred party. The particular voice communications characteristics can include, but are not limited to, a desired quality level, and signal bandwidth.

The term dial string is meant to include any identifier which can be used in initiating a communications session with an intended recipient. By way of example and not limitation a dial string can be a phone number, a short code, a STAR command, or other string that identifies an intended recipient of a voice communication. A user can enter a dial string in a variety of ways such as through the use of a keypad, voice command, speed dial, call return, or other method. The intended recipient can be a communications device capable of receiving the voice communication and can include by way of example and not limitation, a cellular telephone, a land-based phone, and automated services. The term preferred dial string means a dial string for which the characteristics of an encoded signal should be tailored. The term premier dial string means a dial string for which the desired characteristic is a very high quality voice communication. Thus, a premier dial string should be considered a subset of a preferred dial string having a particular characteristic.

In exemplary embodiments, the characteristics of the encoded voice signal can be customized for the intended recipient of a voice communication by configuring the operation of a vocoder to produce an encoded voice signal of desired characteristics. For example, a particular bit rate of a vocoder can be selected based upon the intended recipient of the voice communication. Thus, where high quality voice communications are desired, a high vocoder bit rate mode can be selected.

In an exemplary embodiment, the preferred dial strings can comprise a list of premier dial strings associated with premier parties that are entitled to high quality voice communications. The premier dial strings can be stored in a device's memory, and a dial string entered by a user can be compared to the premier dial strings. If the user-entered dial string matches a premier dial string, then a high bit rate mode of a vocoder is selected to generate a high quality encoded voice signal. If the user enters a dial string that does not match a premier dial string, then a default mode of selecting the vocoder bit rate level can be used, such as the default mode of an AMR vocoder. As discussed in more detail below, in other embodiments the preferred dial strings can include an associated code which is used to determine the particular characteristics of an encoded voice signal to be generated.

An exemplary method of the invention for providing a high quality voice signal for premier parties entitled to high quality voice communications, includes: receiving a dial string from a user; determining if the user-provided dial string is associated with a premier dial string; and, if so, selecting a high bit rate encoding mode to generate a high quality encoded voice signal. The exemplary method can further include the steps of storing at least one premier dial string at the device; and generating an encoded voice signal in accordance with the selected vocoder bit rate; and transmitting the encoded voice signal.

An exemplary embodiment of an apparatus of the invention is in the form of a cellular telephone that automatically adjusts the characteristics of an encoded voice signal in response to the intended recipient. The cellular telephone can tailor the characteristics of a voice communication by varying the operational mode of a vocoder that generates an encoded voice signal. For example, the bit rate of an adjustable bit rate vocoder can be adjusted to provide a voice signal of a desired quality. The particular characteristics of the encoded voice signal can be determined by storing a list of preferred dial strings associated with intended recipients that are entitled to particular characteristics. In the case of recipients that desire high quality communications, referred to herein as premier parties, the device can store preferred dial strings comprising premier dial strings. The device can compare a dial string entered by the user with the premier dial string list to determine whether the user-entered dial string is on the premier list. If so, then a high quality bit rate voice signal is generated. If the user-entered dial string is not on the preferred dial string list then a default rate can be used. An exemplary apparatus of the invention can include a microphone to receive voice input; a memory to store preferred dial strings; a user input means to receive a dial string from a user; a vocoder having a plurality of selectable bit rate modes; a mode selector module for providing logic for determining the selection of the proper mode of a vocoder; and a controller to select a vocoder bit rate in response to the user input dial string.

In some embodiments, dial strings can be provided with a code or other indicator indicating a desired characteristic of encoded voice signals associated with a dial string. In one exemplary embodiment, a code indicating a desired bit rate level for an associated dial string is provided so that upon entry of a dial string by a user a check is made whether the user-provided dial string has an associated desired vocoder bit rate level, and if so, the desired bit rate is used. An exemplary method of that embodiment comprises: receiving a dial string from a user; determining if a preference code is associated with the dial string; and if so, selecting a vocoder bit rate in response to the preference code.

It is contemplated that the dial strings and codes can be stored at the device upon manufacture. For example, in a GSM communications device preferred dial strings can be stored on a SIM card. In addition, the list of dial strings can be provided and/or updated after manufacture of the device. For example, a communications provider can develop a new service for which high quality voice communications are desired and provide an associated preferred dial string to the user's device. The preferred dial string can be stored in memory of the device by Over The Air Programming (OTAP) techniques. For example, a text string including a preferred dial string can be sent over the air to the device and the premier dial string extracted and stored in a memory at the device. An exemplary method of updating the preferred dial string list comprises: receiving a signal at a communications device, said signal including at least one preferred dial string associated with a party for which a predetermined characteristic of an encoded voice signal is desired; and storing the dial string at the communications device.

In another embodiment the preferred dial strings can be stored at a communications network. For example, in a cellular telephone context dial strings can be stored at a base station. When a user enters a dial string at the device the user-provided dial string can be sent to the base station. For example, the dial string can be sent as part of a communication initiation signal on the communications network. The base station receives the dial string and determines whether the user-entered dial string is a premier dial string and, if so, sends a response to the device including instructions for configuring the appropriate vocoder mode. The device receives the instruction and configures the vocoder accordingly. An exemplary method of the invention in which the preferred dial strings are stored at a base station comprises: receiving a user provided dial string at a device; sending the user-provided dial string to a base station; receiving the signal at the base station; determining a desired vocoder bit rate of the device in response to the dial string; and sending a response to the device including a desired vocoder bit rate. The method can further include storing a list of preferred dial strings at the base station and configuring a vocoder of the device in response to the instructions.

While the exemplary embodiments are described with reference to a cellular telephone it will be understood by one of skill in the art that the teachings disclosed herein can be applied to other communications devices which encode digital voice signals. In addition, while the exemplary embodiments are discussed with reference to GSM-based cellular telecommunications systems it is contemplated that the systems and methods of the present invention can be utilized with other communications networks, and it will be understood that such systems are within the scope and spirit of the present invention.

BRIEF DESCRIPTION OF THE DRAWINGS

FIG. 1 shows an exemplary embodiment of a system of the present invention.

FIG. 2 shows a flowchart that illustrates an exemplary method of the present invention.

FIGS. 5A-5C show exemplary embodiments of a system flow in accordance with an exemplary embodiment of the present invention.

DETAILED DESCRIPTION

Figure 3:
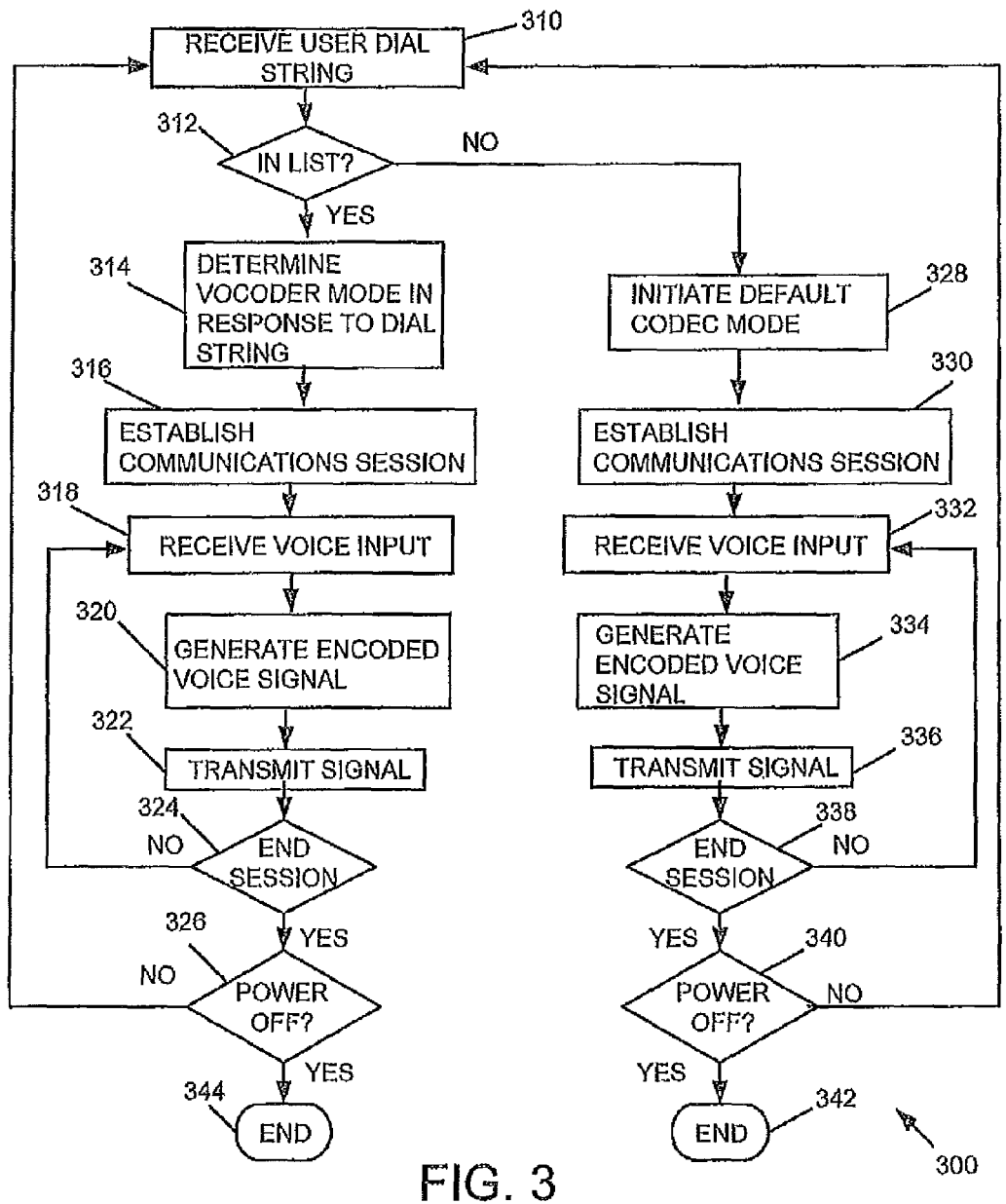
FIG. 3 shows a flowchart that illustrates an exemplary method of the present invention.

While AMR vocoders are sufficient for their intended purpose, it is sometimes desirable to provide an encoded voice signal with particular characteristics based upon the intended recipient, and/or intended use of a voice communication. For example, it can be desirable to provide the highest quality voice signal for voice communications with a particular party. As used herein, a "recipient" can include, but is not limited to, a human user, a service configured to receive sound and/or speech input, and any device configured to receive sound and/or speech input. For example, a communications provider can offer premier services for which very high quality voice communications are desired to ensure customer satisfaction. Such premier services can include, by way of example and not limitation, directory assistance, driving directions, movie listings, reservations, etc. These premier services typically employ voice recognition applications which require high quality voice signals so that a user's voice commands are readily understood. The failure of a voice recognition system to interpret a user's voice not only decreases the quality of the user's experience but also increases the service provider's costs by requiring the intervention of a human operator. These premier services are typically high profit margin offerings which make any decrease in network capacity resulting from the use of higher quality (and higher bandwidth) signals acceptable. Thus, it would be desirable to provide a system that ensures that a voice communication with a premier service is of a high quality.

While there may be situations where it is desirable to provide a very high quality voice communication for particular recipients of a voice communication as discussed above, in other cases it may be desirable to provide voice communications with different characteristics. For example, it may be desirable to provide a low bandwidth voice communication for a particular recipient. Thus, a low bit rate encoded voice signal can be appropriate for communications with such parties.

Generally speaking, the systems and methods taught herein are directed to controlling the characteristics of an encoded voice signal based on the intended recipient of a voice communication. By applying what is taught herein an encoded voice signal can be generated having characteristics adapted for an intended recipient.

As required, exemplary embodiments of the present invention are disclosed. These embodiments are provided as examples of various embodiments of the invention and it will be understood that the invention can be embodied in alternative forms. The figures are not to scale and some features may be exaggerated or minimized to show details of particular elements, while related elements may have been eliminated to prevent obscuring novel aspects. Therefore, specific structural and functional details disclosed herein are not to be interpreted as limiting, but merely as a basis for the claims and as a representative basis for teaching one skilled in the art to variously employ the present invention.

In the following description and claims, the term "coupled" may be used. It should be understood that this term may mean that two or more elements are in direct physical or electrical contact and can also mean that two or more elements are not in direct contact with each other, but yet still co-operate or interact with each other. For purposes of teaching and not limitation, the illustrated embodiments are directed to a communication device in the form of a cellular telephone.

Referring now to the drawings, wherein like numerals represent like elements throughout, FIG. 1 illustrates an Adaptive Voice Communications Device (AVCD) 101 in the form of a cellular telephone being used by a user 105 to generate an encoded voice signal 107 for communication with an intended recipient 111. The AVCD 101 receives voice input 103 from the user 105 and produces an encoded voice signal 107 tailored for the recipient 111. A communications session can be established between the AVCD 101 and the intended recipient 111 wherein the encoded voice signal 107 is sent to the recipient 111 over a communications network 109. By voice input 103 it is meant any sound, such as speech, which the user intends to communicate to the intended recipient 111. The term "speech" will be used herein. Its use, however, should not be considered limiting as the invention is equally applicable to any sound capable of being accepted at an input of an Adaptive Voice Communications Device (AVCD) 101 and digitized for transmission over a communications network.

As discussed in more detail below, the AVCD 101 can receive an identifier, such as a dial string that is associated with the intended recipient 111. The AVCD 101 can then produce an encoded voice signal 107 having characteristics tailored for the intended recipient 111. For example, the encoded voice signal 107 can be adjusted to have a particular sound quality, bandwidth, or other characteristic depending upon the identity of the intended recipient 111.

FIG. 2 shows an exemplary method 200 of the invention in which an encoded voice signal of desired characteristics is generated based on the intended recipient of a voice communication. At block 201 the identity of an intended recipient of a voice communication is determined. At block 203 a communications device is configured to generate an encoded voice signal with desired characteristics for the intended recipient.

Turning to FIG. 3 there is shown an exemplary method 300 of the invention in which the characteristic desired is a high quality voice communication for certain intended recipients. These recipients, referred to as premier parties, are provided with high quality voice communications by providing an encoded voice signal of a high bit rate. In this embodiment, a plurality of preferred dial strings associated with the premier parties, referred to herein as premier dial strings, are stored in memory at the AVCD 101 and used to determine whether to provide the high quality encoded voice signal.

At block 310 a dial string associated with an intended recipient of a voice communication is received at the AVCD 101. For example, in the context of a cellular telephone, a user can enter the phone number of an intended recipient using a keypad, voice command, speed dial, redial, or other means. By dial string it is meant any identifier used for establishing a communications session with an intended recipient. For example, a dial string can be a phone number, STAR number, short code, or other identifier used in establishing a voice communications session with the recipient. The recipient can be an automated service, an operator, a voice mail service, or other entity for which voice communication will be established. In this example, the intended recipient can be a premier service that includes a voice recognition system and the dial string can be a STAR number such as *411.

Once the user-provided dial string is received at the AVCD 101, a determination is made at block 312 whether the user-provided dial string is in the list of premier dial strings for which a high quality encoded voice signal is desired. If the user-entered dial string is not on the premier dial string list then, as described in more detail below, a default mode of operation can be initiated at block 328. If at block 312 the user input dial string is in the premier dial string list, then at block 314 a vocoder mode is determined which corresponds to a predetermined bit rate associated with that premier dial string. In this case because a high quality signal is desired the highest bit rate mode is used to generate the encoded voice signal. For example, in an exemplary embodiment in which a cellular telephone includes an AMR vocoder having a plurality of codecs of different bit rates, the highest bit rate codec is used to generate the voice signal.

At block 316 a communications session is established with the intended recipient of the voice communication. For example, a communications session is established with the premier party through use of the user-provided dial string as known in the art, such as via a cellular communications network. In this example, the recipient is a premier service provided by a telecommunications provider which employs a voice recognition system.

Voice input 103, such as speech from user 105, can be received at block 318 and an encoded voice signal 107 generated at block 320 in accordance with the bit rate determined at block 314. The use of a high bit rate causes the encoded voice signal 107 to be of a high quality. The encoded voice signal can then be transmitted to the intended recipient at block 322. For example, the encoded voice signal 107 can be transmitted from the AVCD 101 to a telecommunication network for delivery to the intended recipient 111. It is contemplated that additional manipulation of the encoded voice signal 107 can be performed such as any manipulations associated with delivering the encoded voice signal over a particular communications network as known in the art. It is also contemplated that the encoded voice signal can be decoded and further processed prior to delivery to the recipient 111.

A check can then be made at block 324 as to whether the communications session has ended. If the communications session has not ended then voice input 103 continues to be received and encoded voice signals to be generated in accordance with the bit rate selected at block 314. If the communications session has ended, then a check at block 326 can be made as to whether to power off the device and end 344 or to await the receipt of another dial string at block 310.

Returning to the discussion of block 312, if the user-provided dial string is not in the premier dial string list then a default mode of operation of the vocoder can be initiated at block 328 in which the bit rate for the encoded signal is determined by factors other than the identity of the intended recipient. Thus, a communication session can be established at block 330, voice input received at block 332, and an encoded voice signal generated at block 334 in accordance with the default settings. For example, in the case of an AMR vocoder a bit rate mode can be determined based upon signal strength. The generated encoded signal can then be transmitted at block 336. And similar to the discussions above related to blocks 324 and 326 decisions can be made whether the communications session has ended at block 338 and whether to power off the device at block 340 and end at block 342. If the session has not ended, then voice input will be received and processed in accordance with the default parameters chosen at block 328. Thus, it is contemplated that if the user-provided dial string is associated with a premier dial string then the default mode of operation of the vocoder will be overridden with the preferred characteristics of the premier party.

It is contemplated that the strings can be stored at the device by a variety of means. For example, the preferred dial strings could be placed in memory during manufacture of the AVCD 101 such as by storing them on a SIM card along with other information commonly stored thereon, such as a user's phone number, a unique user code, a user's voice mail number, etc. as known in the art. Alternatively, the AVCD 101 could be provided with a separate memory module for storing preferred dial strings during manufacture. As discussed in more detail below, it is also contemplated that the dial strings could be placed in memory by Over The Air Programming (OTAP).

Figure 4:
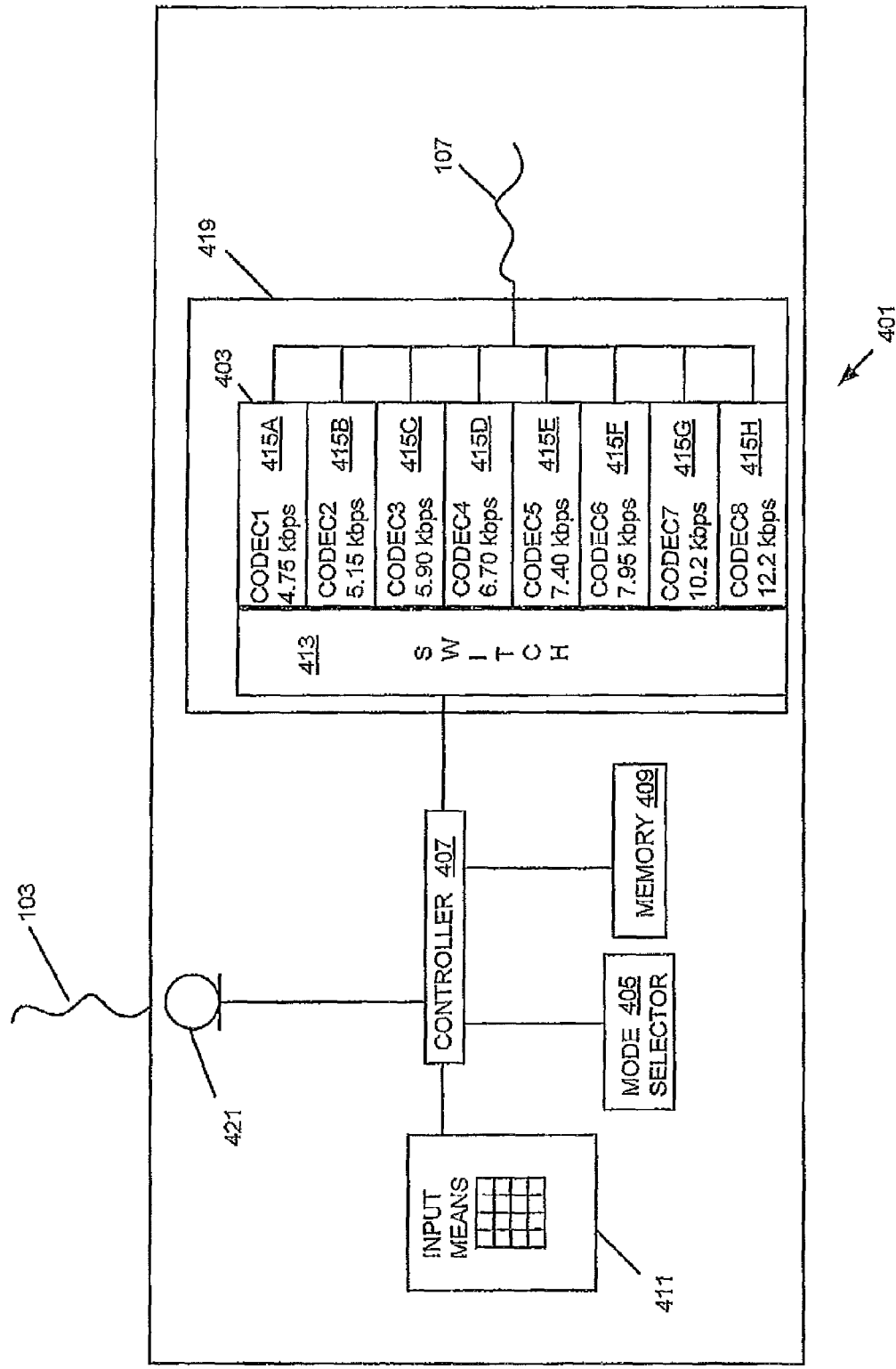
FIG. 4 shows a block diagram of an apparatus in accordance with an exemplary embodiment of the present invention.

FIG. 4 shows a block diagram of an exemplary embodiment of an AVCD 401 in the form of a cellular telephone. As will be explained in more detail below, the device 401 includes an AMR vocoder 403 for generating an encoded voice signal 107. The vocoder 403 includes eight codecs 415A; 415B; 415C; 415D; 415E; 415F; 415G; 415H having bit rates of 4.75 kbps; 5.15 kbps; 5.9 kbps; 6.7 kbps; 7.40 kbps; 7.95 kbps; 10.2 kbps; and 12.2 kbps, respectively. Such AMR vocoders are currently employed on some GSM networks. As discussed above, the higher the bit rate used the higher the quality of the resulting encoded voice signal 107. The codecs 415A-H are shown as part of a larger DSP module 419 which includes a switch 413 for selecting a particular codec 415A-H to generate an encoded voice signal 107. It should be understood that the switch 413 can be implemented via programming instructions to the DSP causing the DSP to select a mode of operation so as to function as a particular codec. Elements not critical to the present teaching and well understood by those of skill in the art, such as power supply, speaker, analog to digital converter, and other elements will not be discussed in detail so as not to obscure the invention. Although the DSP module 419 is shown as a single chip it will become apparent to one of skill in the art that other configurations are possible such as separate chips.

A voice receiving means 421 in the form of a microphone is provided for receiving voice input 103 and providing it to the DSP module 419 to be converted into an encoded voice signal 107. For example, a user can speak into the microphone 421 so that voice input is received and provided to the DSP module 419 to be converted into digital format, compressed, and encoded. In addition to a microphone 421 voice input can be received by any other sound transducer device known in the art.

A memory 409 is provided to store preferred dial strings associated with intended recipients entitled to voice communications having particular characteristics. The memory 409 can be a separate memory module or database or part of another memory used in the device. For example, in a GSM phone the memory 409 can be in the form of a SIM card which is a printed circuit board used for storing phone numbers, personal settings, subscriber details, security information, personal directories, caller identification data, and other data. In this scenario the dial strings could simply be an additional data list stored in the SIM card and designated as a preferred dial string list for use in determining the characteristics of an encoded signal 107.

An input means in the form of a keypad 411 is provided for receiving user-provided dial strings associated with an intended recipient of a voice communication. It is contemplated that means other than a keypad can be employed such as a voice command engine.

A mode selector 405 is provided to determine the proper characteristics of an encoded voice signal generated by the vocoder 403. The mode selector 405 can be in the form of software programs to operate a controller 407. The mode selector 405 can be software, hardware, or firmware.

The controller 407 is coupled to the microphone 421, keypad 411, memory 409, mode selector 405, and DSP module 419. The controller 407 can comprise a microprocessor or integrated circuit. While shown as a separate module for clarity the controller 407 can be part of another chip in the device. For example, the controller 407, mode selector 405 and memory 409 could be combined onto a single chip. In operation the controller 407 receives a dial string provided at the keypad 411 and in accordance with the instructions of the mode selector 405 directs the vocoder 403 to generate an encoded voice signal 107 with desired characteristics. For example, the mode selector 405 can direct the controller to access memory 409 and determine whether the user-provided dial string received from the keypad 411 is in the list of preferred dial strings stored in memory 409 and thereby determine a desired format of the encoded voice signal. The controller 407 can then direct the vocoder 403 to generate an encoded signal with desired characteristics by directing switch 413 to select a particular codec 415A-H to encode the voice input 103 received from the microphone 421. The encoded voice signal 107 can be transmitted by a transmitter (not shown) as known in the art.

In an alternative embodiment, in addition to a list of preferred dial strings, an associated code indicating a desired characteristic of an encoded voice signal can also be stored in memory 409. For example, a quality level code from 1 to 8 can be provided indicating which of the eight codecs should be used for a particular dial string, with level 1 indicating that the lowest bit rate codec should be used while a code level of 8 would indicate that the highest bit rate codec should be used. For example, a dial string for an intended recipient associated with a network of limited capacity can be stored with a code level of 1 so that the lowest bit rate codec is used. This would allow for increased system capacity on the network.

FIG. 5A shows an exemplary use of the invention in which an AVCD 501 in the form of a cellular telephone is configured to provide a high quality encoded voice signal to a desired recipient 513 in the form of a *411 information system. As discussed above, a list of preferred dial strings 503 for which a high quality voice communications session is desired can be stored in memory of the AVCD 501. In this example, dial strings *411, #121, and 555-123-4567 are stored in memory and associated with premier services provided by a telecommunications provider for which a high quality voice communication is desired. In this example, the user inputs the *411 dial string at the AVCD 501 which is associated with information service 513. The AVCD 501 receives the *411 string and checks whether the *411 string is in a preferred dial string list 503. Because the *411 string is in the preferred dial string list 503 the AVCD 501 uses a high bit rate vocoder mode to process voice signals 103 received from the user 105 to generate a high quality compressed digital signal 107.

A communication session can be established between the AVCD 501 and the *411 service 513 and the high bit rate encoded voice signal 107 transmitted over a network to the *411 service 513. In this example, a transmission including the encoded voice signal is sent to a base station 509 that receives and decodes the encoded voice signal 107 using another vocoder (not shown). The decoded voice signal can then be converted into other formats as required and transmitted over a communications network 511 to the *411 system 513. For example, the decoded signal can be converted into PCM format for transmission over a PSTN network or other network 511 to the intended recipient, which in this case is the *411 service 513 which employs a speech recognition engine. This allows the user 105 to communicate with the *411 service 513 while transmitting a high quality voice signal that can be readily understood by the *411 service. For example, the user 105 can use voice commands to request information from the *411 service such as a telephone number for a party or directions to a particular location. Because the AVCD 501 used a high bit rate vocoder the voice communication received at the *411 service 513 is of high quality thereby increasing the probability that the voice commands will be understood by the voice recognition system, increasing the quality of the user's experience, and avoiding the intervention of a human operator.

In the example shown in FIG. 5A, the preferred dial strings stored at the device were premier dial strings entitled to a high bit rate vocoder. But it is contemplated that additional information can be provided with the dial strings to specify different characteristics for particular dial strings associated with different recipients. As discussed above, a code such as a number from 1 to 8 can be associated with the preferred dial strings to specify a particular desired characteristic of an encoded voice signal. For example, it may be desirable that voice communications to a particular recipient have a low bandwidth and therefore a low vocoder bit rate should be employed. This may be the case for certain emergency networks such as E911 which has tight bandwidth constraints. Thus, as shown in FIG. 5B the emergency dial string 911 can be stored in memory at the AVCD 501 with an associated code of 1 indicating that the lowest rate vocoder be used. If the user enters the 911 dial string then the lowest bit rate vocoder is selected and the resulting encoded signal is transmitted to the 911 emergency system.

Figure 5C:
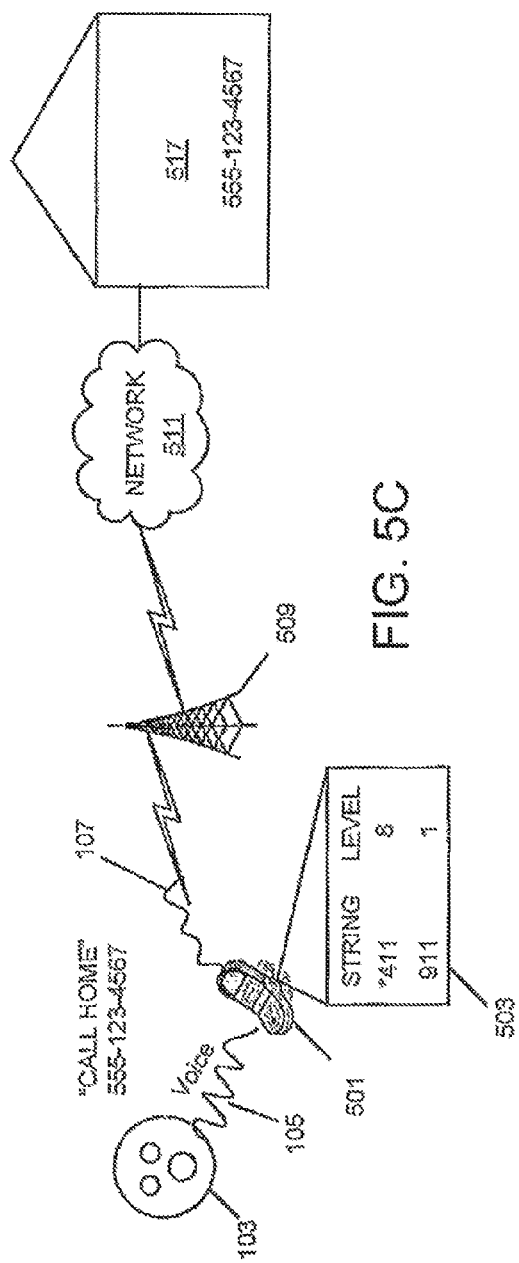

As shown in FIG. 5C, instead of entering a dial string using a keypad a user can use a voice command or other technique to enter a dial string. In the example shown in FIG. 5C a user issues the voice command "Call Home" which has been previously associated in his voice address book with the dial string 555-123-4567. Because the 555-123-4567 dial string is not in the preferred dial string list 503 the AVCD 501 will not select a vocoder bit rate based on the intended recipient but will enter a default mode of operation to select a vocoder. For example, a vocoder bit rate can be selected based on the signal strength of a signal transmitted between the cellular phone and a base station.

Figure 6:
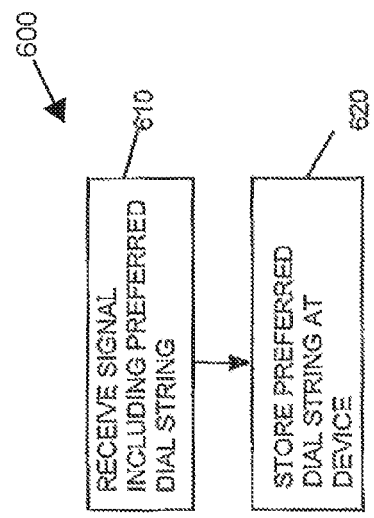
FIG. 6 shows a flowchart that illustrates another exemplary method of the present invention.

As previously mentioned preferred dial strings can be stored at the device during or after manufacture. FIG. 6 shows an exemplary method 600 of providing preferred dial strings to an AVCD using Over The Air Programming commonly employed on GSM networks for updating the contents of a SIM card of a cellular telephone. At block 610 a signal including a preferred dial string is received at the AVCD. For example, a telecommunications provider can transmit an SMS text message in accordance with Over The Air Programming techniques used for updating a SIM card in a GSM cellular telephone. The signal can be received by the AVCD and the dial string stripped from the message. At block 612 the preferred dial string can then be stored at the device.

Figure 7A:
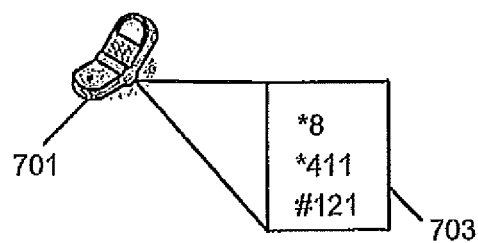
FIGS. 7A-7B show an exemplary method of the present invention for updating preferred dial strings.
Figure 7B:
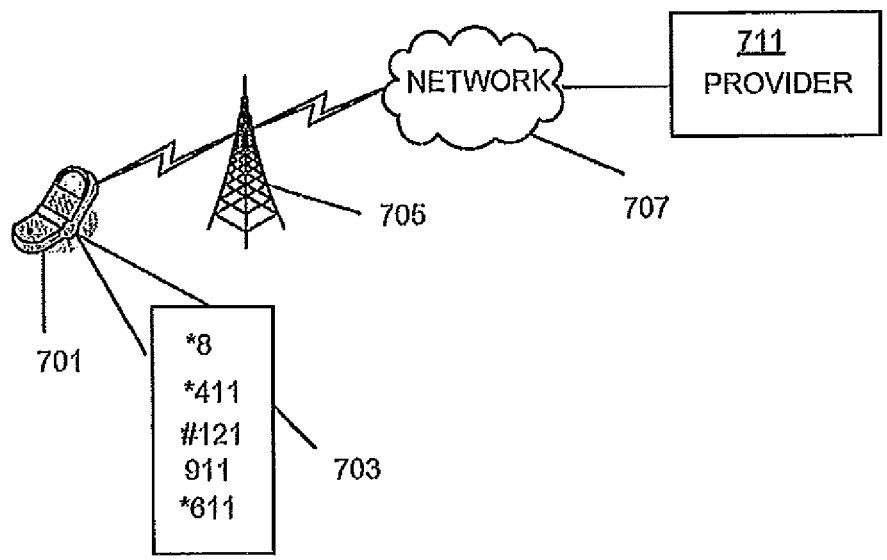

FIGS. 7A-7B show how an AVCD 701 in the form of a cellular telephone can be updated to include a new preferred dial string. The AVCD 701 in FIG. 7A includes a list of preferred dial strings 703 stored in memory which includes *8, *411, and #121. A telecommunications provider can add a new STAR service such as a service that provides directions for voice requested addresses. The new service can be associated with the dial string *611. To enable efficient use of the service the service provider desires that voice communications with the service be of high quality. Thus, the service provider desires to add the *611 dial string to the preferred dial string list 703 stored at the AVCD 701 so that a high bit rate vocoder can be used for voice communications with the *611 service. As shown in FIG. 7B an SMS text message including the *611 dial string can be sent over a communications network 707 to a base station 705 and from the base station 705 to the AVCD 701. The AVCD 701 can then extract the preferred dial string from the signal and store it in memory at the AVCD 701. The AVCD 701 is now updated so that if the *611 dial string is entered by a user then a desired vocoder mode will be selected and an encoded voice signal with desired characteristics will be generated. As discussed in more detail below, in other embodiments the preferred dial strings can be stored at a base station 705 instead of at the AVCD 701, in which case the new *611 dial string can be stored at the base station 705 directly. A base station is used as an example. The preferred dial strings can be stored in other locations on the communications network as well.

Figure 8:
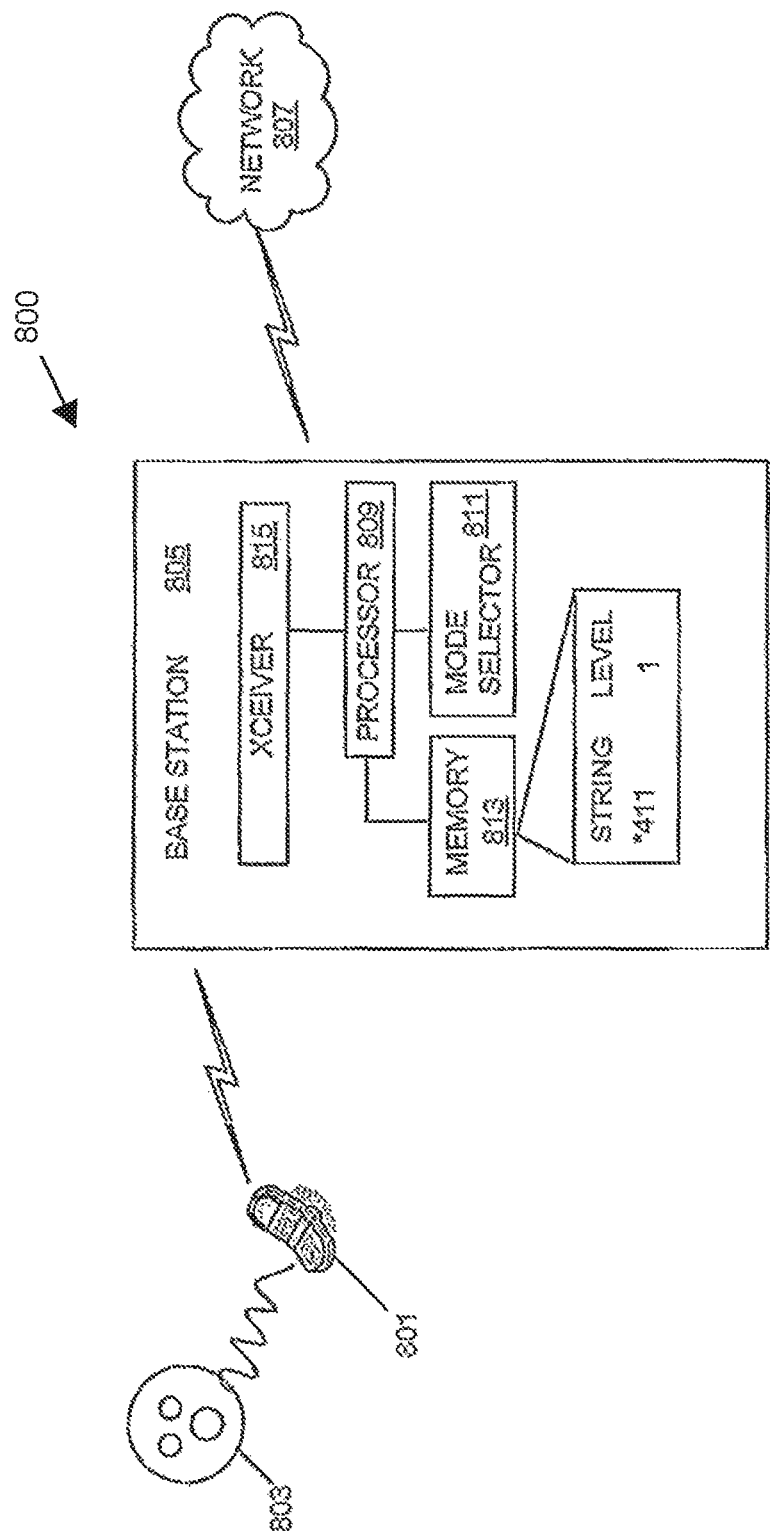
FIG. 8 shows a system in accordance with an exemplary embodiment of the present invention.

FIG. 8 shows an exemplary embodiment of a system 800 of the present invention in which preferred dial strings are stored on a portion of a communications network rather than on the AVCD itself. As seen in FIG. 8, an AVCD 801, again in the form of cellular telephone, receives voice input from a user 803 and is configured to generate an encoded voice signal with characteristics desired by an intended recipient of a voice communication. The AVCD 801 shown in FIG. 8 is similar in construction to that of the AVCD 401 discussed with reference to FIG. 4 above and the particular components will not be described in detail. However, it should be noted that some of the components previously found at the AVCD 401 of FIG. 4 are now located at the base station 805. For example, the base station 805 can include a processor 809, a mode selector 811, and a memory 813 which can include a database. Similar to the memory 409 discussed above with reference to FIG. 4, the memory 813 is used to store preferred dial strings and the mode selector 811 includes instructions for selecting an appropriate vocoder at the AVCD 801 to generate an encoded voice signal with desired characteristics. The processor 809 is coupled to the memory 813 and mode selector 811 so that it can retrieve the list of preferred dial strings and instructions for identifying a proper vocoder mode. A transceiver 815 is provided to send and receive messages between the base station 805 and the AVCD 801.

When the user 803 enters a dial string at the AVCD 801, such as *411, to initiate a call to an intended recipient, a signal is transmitted to the base station 805 that includes the user-entered *411 dial string. The base station 805 receives the user-entered dial string and searches the list of preferred dial strings stored in memory 813 to determine whether the user-provided dial string is a preferred dial string. In this example, the *411 dial string has an associated code of 1 corresponding to a particular characteristic, such as a quality level of an encoded voice signal. The mode selector 811 determines the appropriate vocoder mode for the AVCD 801 and sends a response signal including instructions for the AVCD 801 to select a particular vocoder mode. The AVCD 801 receives the instructions and selects a vocoder mode accordingly to generate an encoded voice signal which can then be transmitted as part of a voice communication to the base station 805. The voice communication can then be processed by the base station 805 and transmitted over a communications network 807 as known in the art.

Figure 9:
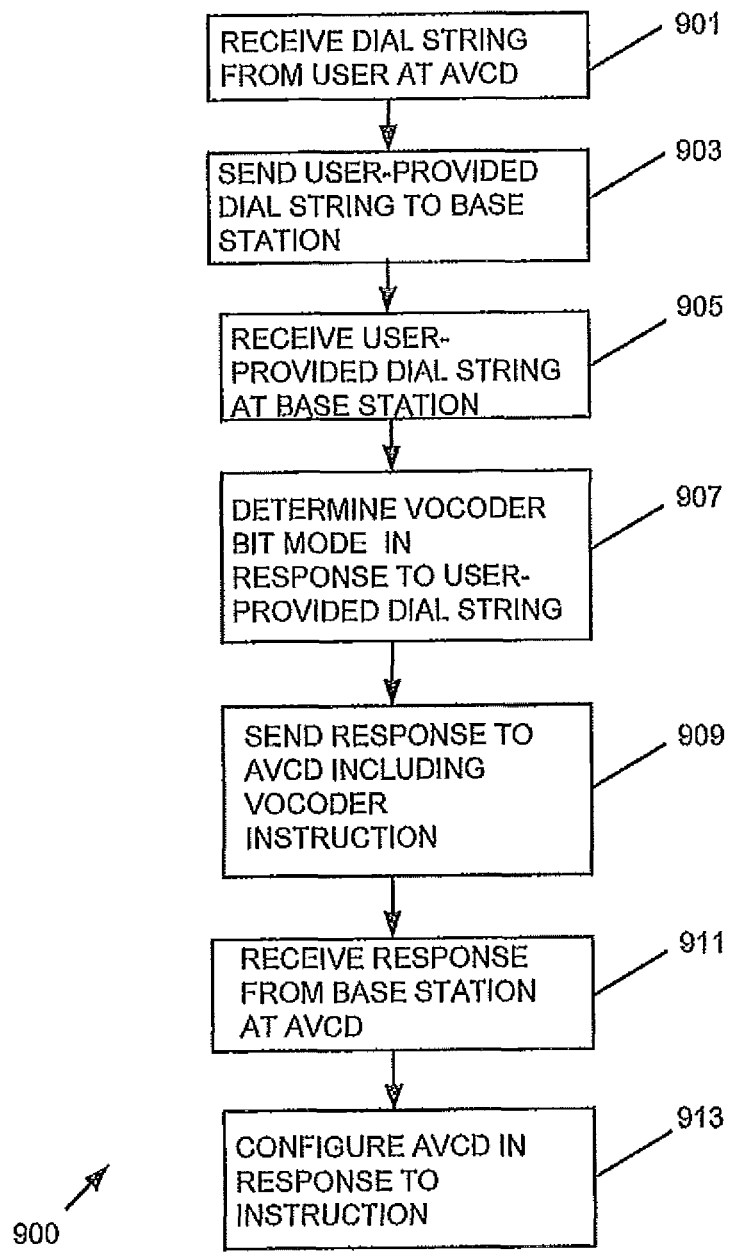
FIG. 9 shows a flow chart that illustrates another exemplary method of the invention.

FIG. 9 shows an exemplary method 900 of configuring an AVCD 801 to encode a voice signal in accordance with desired characteristics for a particular recipient in which the preferred dial strings are stored at a base station. At block 901 a user-provided dial string is received at the AVCD 801. For example, a user can enter a dial string using a keypad at the AVCD 801 as discussed above. At block 903 the user-provided dial string is sent to the base station 805. For example, the dial string can be included in a signal to initiate a communications session with the intended recipient over a communications network. At block 905 the user-provided dial string is received at the base station 805. At block 907 the characteristics of an encoded voice signal to be generated by the AVCD 801 can be determined in response to the dial string, such as by determining whether the user-provided dial string is in the preferred dial string list in memory 813. At block 909 a response is sent to the AVCD 801 including the desired encoded signal characteristics, such as the desired vocoder bit rate. For example, a response can be sent incorporating a numeric code for selecting a particular codec for a mobile communications device having multiple codecs. It is contemplated that if the user-provided dial string is not a preferred dial string then the base station can simply not respond to the dial string so that the AVCD 801 enters a default mode of operation. At block 911 the response signal is received at the AVCD 801 and at block 913 the mobile communications device is configured according to the desired code The above-described and illustrated embodiments of the present invention are merely exemplary examples of implementations set forth for a clear understanding of the principles of the invention. Variations and modifications can be made to the above-described embodiments, and the embodiments may be combined, without departing from the scope of the following claims.

What is claimed is:

1. A system, comprising:
   a processor; and
   a computer-readable storage medium comprising computer-executable instructions that, when executed by the processor, cause the processor to perform operations comprising:
   receiving a dial string being associated with an intended recipient of a voice communication; and
   determining, based on the dial string received, whether the intended recipient is entitled to an encoded voice signal.

2. The system of claim 1, wherein determining, based on the dial string received, whether the intended recipient is entitled to the encoded voice signal, comprises determining whether the intended recipient is entitled to the encoded voice signal having a predetermined characteristic.

3. The system of claim 1, wherein determining, based on the dial string received, whether the intended recipient is entitled to the encoded voice signal, comprises determining whether the intended recipient is entitled to the encoded voice signal based upon whether the dial string received is in a preferred dial string list.

4. The system of claim 3, wherein determining, based upon whether the dial string received is in the preferred dial string list, whether the intended recipient is entitled to the encoded voice signal, comprises determining whether the intended recipient is entitled to the encoded voice signal based upon whether the dial string is in the preferred dial string list being stored in a preferred-dial string list at the system.

5. The system of claim 3, wherein determining, based upon whether the dial string received is in the preferred dial string list, whether the intended recipient is entitled to the encoded voice signal, comprises determining whether the intended recipient is entitled to the encoded voice signal based upon whether the dial string is in the preferred dial string list of a preferred-dial string list accessible to the system.

6. The system of claim 1, wherein the system is configured to be a part of a communications-network base station.

7. The system of claim 6, wherein the system is a part of the communications-network base station.

8. The system of claim 1, wherein receiving the dial string associated with the intended recipient of the voice communication comprises receiving the dial string from a voice communications device.

9. A computer-readable storage device comprising computer-executable instructions that, when executed by the processor, cause a processor to perform operations comprising:
    receiving a dial string being associated with an intended recipient of a voice communication; and
    determining, based on the dial string received, whether the intended recipient is entitled to an encoded voice signal.

10. The computer-readable storage device of claim 9, wherein determining, based on the dial string received, whether the intended recipient is entitled to the encoded voice signal, comprises determining whether the intended recipient is entitled to the encoded voice signal having a predetermined characteristic.

11. The computer-readable storage device of claim 9, wherein determining, based on the dial string received, whether the intended recipient is entitled to the encoded voice signal, comprises determining whether the intended recipient is entitled to the encoded voice signal based upon whether the dial string received is in a preferred dial string list.

12. The computer-readable storage device of claim 11, wherein determining, based upon whether the dial string received is in the preferred dial string list, whether the intended recipient is entitled to the encoded voice signal, comprises determining whether the intended recipient is entitled to the encoded voice signal based upon whether the dial string received is in the preferred dial string list wherein the preferred dial string list is stored in a preferred-dial string list being stored at the computer-readable storage device.

13. The computer-readable storage device of claim 11, wherein determining, based upon whether the dial string received is in the preferred dial string list, whether the intended recipient is entitled to the encoded voice signal, comprises determining whether the intended recipient is entitled to the encoded voice signal based upon whether the dial string received is in the preferred dial string list wherein the preferred dial string list is in a preferred-dialstring list accessible to the processor executing the instructions.

14. The computer-readable storage device of claim 9, wherein receiving the dial string being associated with the intended recipient of the voice communication comprises receiving the dial string from a voice communications device.

15. A method, comprising:
    receiving, by a system comprising a processor, a dial string being associated with an intended recipient of a voice communication; and
    determining, by the system, based on the dial string received, whether the intended recipient is entitled to an encoded voice signal.

16. The method of claim 15, wherein determining, based on the dial string received, whether the intended recipient is entitled to the encoded voice signal, comprises determining, based on the dial string received, whether the intended recipient is entitled to the encoded voice signal having a predetermined characteristic.

17. The method of claim 15, wherein determining, based on the dial string received, whether the intended recipient is entitled to the encoded voice signal, comprises determining whether the intended recipient is entitled to the encoded voice signal based upon whether the dial string received is in a preferred dial string list.

18. The method of claim 17, wherein determining, based upon whether the dial string received is in the preferred dial string list, whether the intended recipient is entitled to the encoded voice signal, comprises determining whether the intended recipient is entitled to the encoded voice signal based upon whether the dial string received is in the preferred dial string list wherein the preferred dial string list is stored in a preferred-dial string list at the system.

19. The method of claim 17, wherein determining, based upon whether the dial string received is in the preferred dial string list, whether the intended recipient is entitled to the encoded voice signal, comprises determining whether the intended recipient is entitled to the encoded voice signal based upon whether the dial string received is in the preferred dial string list wherein the preferred dial string list is in a preferred-dial string list accessible to the system.

20. The method of claim 15, wherein receiving the dial string being associated with the intended recipient of the voice communication comprises receiving the dial string from a voice communications device.

\* \* \* \* \*